(12) United States Patent
Matsunaga

(10) Patent No.: US 8,390,847 B2
(45) Date of Patent: Mar. 5, 2013

(54) FACSIMILE TRANSFERRING SYSTEM

(75) Inventor: Masayuki Matsunaga, Tokyo (JP)

(73) Assignee: Oki Data Corporation, Tokyo (JP)

( * ) Notice: Subject to any disclaimer, the term of this patent is extended or adjusted under 35 U.S.C. 154(b) by 670 days.

(21) Appl. No.: 12/362,512

(22) Filed: Jan. 30, 2009

(65) Prior Publication Data
US 2009/0201545 A1 Aug. 13, 2009

(30) Foreign Application Priority Data
Feb. 13, 2008 (JP) .................... 2008-031183

(51) Int. Cl.
*G06F 3/12* (2006.01)
(52) U.S. Cl. .................. 358/1.15; 358/407; 358/426.12; 712/26
(58) Field of Classification Search .................. 358/1.15
See application file for complete search history.

(56) References Cited

U.S. PATENT DOCUMENTS

| | | | |
|---|---|---|---|
| 2003/0227647 A1* | 12/2003 | Gallacher | 358/1.15 |
| 2006/0289627 A1* | 12/2006 | Nonaka et al. | 235/375 |
| 2007/0198102 A1* | 8/2007 | Umehara et al. | 700/32 |

FOREIGN PATENT DOCUMENTS

| | | | |
|---|---|---|---|
| JP | 09-321970 | | 12/1997 |
| JP | 2006186844 | * | 7/2006 |

* cited by examiner

*Primary Examiner* — Marivelisse Santiago Cordero
*Assistant Examiner* — Aaron R Gerger
(74) *Attorney, Agent, or Firm* — Panitch Schwarze Belisario & Nadel LLP

(57) ABSTRACT

A facsimile transferring system is supplied capable of preventing a paper on which facsimile data transferred from his/her work place is printed from leaving as it is at a place where the destination person does not exist. In the system, an entering/leaving room managing equipment and a facsimile apparatus are furnished at plural places respectively; and a transfer/notification processing server transfers received facsimile data to one of the facsimile apparatus on the basis of entering/leaving room management information, wherein the transfer/notification processing server includes a destination person whereabouts managing section that specifies a whereabouts place of destination person of the received facsimile data on the basis of entering/leaving room management information, and a facsimile apparatus controlling section that transfers the received facsimile data to the facsimile apparatus furnished at the whereabouts place of the destination person on the basis of a control of the destination person whereabouts managing section.

13 Claims, 10 Drawing Sheets

| CARD ID | FACSIMILE DATA ID |
|---|---|
| 1 1 1 1 1 1 | 1 1 1 1 1 1 1 1 1 |
| 1 1 1 1 1 1 | 1 3 5 4 5 4 6 7 6 |
| 3 2 1 3 2 1 | 1 6 5 4 9 8 7 3 5 |

*FIG. 9*

FACSIMILE TRANSFERRING SYSTEM

FIELD OF THE INVENTION

The invention relates to a facsimile transferring system that transfers received facsimile data.

BACKGROUND OF THE INVENTION

In Conventional facsimile transferring system, as an example, if facsimile data is sent to a business office having plural work places according to a pilot facsimile number of the business office, the facsimile data is temporarily stored into a predetermined storing section. After that, destination information is extracted from the received facsimile data and the received facsimile data is transferred to a place corresponding to the destination information (refer to patent document 1).

Patent document 1: Japan patent publication No. H09-321970.

In the system mentioned above, the facsimile data is transferred according to the extracted destination information, however, it is not necessarily true that a destination person exists the transfer destination. That is, even if the transfer destination is a work place to which the destination person belongs, it is possible that the destination person is absent from his work place for the reason that he goes out to other work place, or the like. Thus, there is a strong possibility that paper on which the transferred facsimile data is printed is left at a place where the destination person does not exist.

SUMMARY OF THE INVENTION

It is, therefore, an object of the invention to provide a facsimile transferring system capable of solving the above problem.

An aspect of the invention is to provide a facsimile transferring system. The facsimile transferring system comprises an entering/leaving room managing equipment and a facsimile apparatus that are furnished at plural places respectively; and a transfer/notification processing server that transfers received facsimile data to one of the facsimile apparatus on the basis of entering/leaving room management information that is outputted by the entering/leaving room managing equipment, wherein the transfer/notification processing server includes a destination person whereabouts managing section that specifies a whereabouts place of destination person of the received facsimile data on the basis of entering/leaving room management information that is outputted by the entering/leaving room managing equipment, and a facsimile apparatus controlling section that transfers the received facsimile data to the facsimile apparatus that is furnished at the whereabouts place of the destination person on the basis of a control of the destination person whereabouts managing section.

Effect of the Present Invention

A destination person whereabouts managing section manages a whereabouts of a destination person through using a entering/leaving room managing equipment (for example, an entering-room IC card reader and a leaving-room IC card reader), and transfers facsimile data on the basis of destination person management information that is outputted by the destination person whereabouts managing section, therefore, it is possible to transfer facsimile data without requesting special operation for transfer. Further, when destination person leaves room, the destination person whereabouts managing section (for example, a leaving-room IC card reader) notifies the destination person that facsimile data has been transferred, the possibility becomes small, that paper on which the transferred facsimile data is printed is left at a place where the destination person does not exist.

The above and other objects and features of the present invention will become apparent from the following detailed description and the appended claims with reference to the accompanying drawings.

BRIEF DESCRIPTION OF THE DRAWINGS

FIG. 9 is an explanatory diagram of a non-receive DB;

DETAILED DESCRIPTION OF THE PREFERRED EMBODIMENTS

The following is to explain embodiment of the present invention through using drawings.

Embodiment 1

Figure 1:
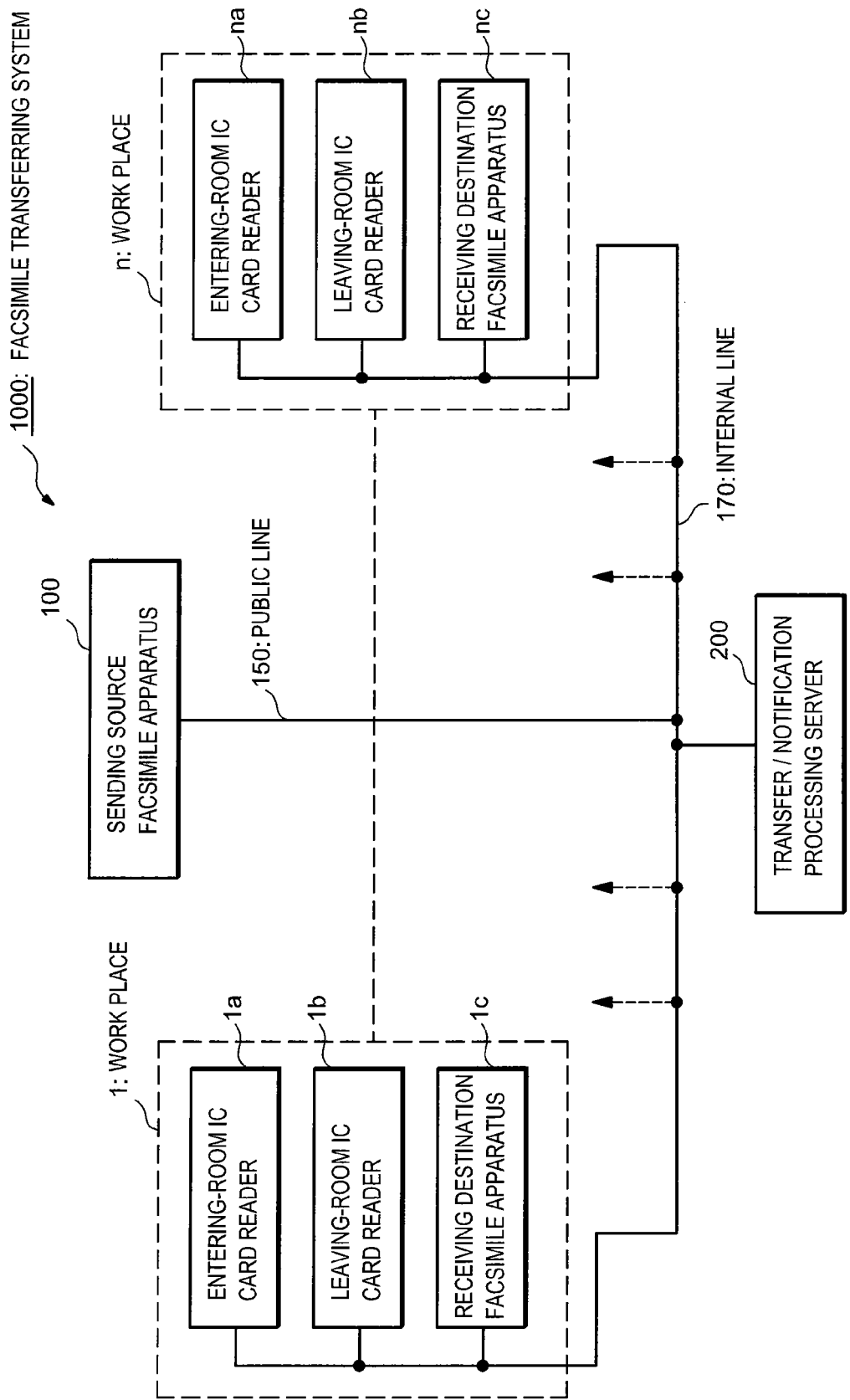
FIG. 1 is a system structure diagram of embodiment 1.

FIG. 1 is a system structure diagram of embodiment 1.

As shown by FIG. 1, for example, a facsimile transferring system 1000 in embodiment 1 is furnished at a business office having plural work places 1~*n*.

As shown by FIG. 1, an internal line 170 formed from LAN or the like, is furnished at the business office having plural work places (1~*n*), and entering-room IC card readers (1*a*~*na*), leaving-room IC card readers (1*b*~*nb*), receiving destination facsimile apparatuses (1*c*~*nc*) and a transfer/notification processing server 200 are respectively connected with the internal line 170. Further, the sending source facsimile apparatus 100 is connected with the internal line 170 via the public line 150 formed from a telephone line or the like. Generally, the internal line 170 is connected with the public line 150 via internal exchanging apparatus or the like, however, in the explanation of the present invention, the explanation about the internal exchanging apparatus is not directly needed, therefore, it is omitted.

The entering-room IC card reader 1*a*, the leaving-room IC card reader 1*b* and the receiving destination facsimile apparatus 1*c* are furnished at the work place 1; the entering-room IC card reader 2*a*, the leaving-room IC card reader 2*b* and the receiving destination facsimile apparatus 2*c* are furnished at the work place 2 (not shown); and likewise, the entering-room IC card reader na, the leaving-room IC card reader nb and the receiving destination facsimile apparatus nc are furnished at the work place n. The same equipments are furnished at the work place 1~the work place n, therefore, its explanation is limited to the work place 1.

The entering-room IC card reader 1a is furnished at the work place 1, and is an equipment for sending an IC card ID and entering-room information that are read from an IC card which is read when user enters the work place 1 to the transfer/notification processing server 200 via the internal line 170. Further, after received a predetermined notice (mentioned below) from transfer/notification processing server 200, the entering-room IC card reader 1a displays a notice on its own display panel (not shown) in the case to read an IC card corresponding to the predetermined notice.

The leaving-room IC card reader 1b is furnished at the work place 1, and is an equipment for sending an IC card ID and leaving-room information that are read from an IC card which is read when user leaves the work place 1 to the transfer/notification processing server 200 via the internal line 170. Further, after received a predetermined notice (mentioned below) from transfer/notification processing server 200, the entering-room IC card reader 1a displays a notice on its own display panel (not shown) in the case to read an IC card corresponding to the predetermined notice.

The receiving destination facsimile apparatus 1c is furnished at the work place 1. When the transfer/notification processing server 200 accepts facsimile data received from the sending source facsimile apparatus 100 via the public line 150, the receiving destination facsimile apparatus 1c prints and outputs it.

The sending source facsimile apparatus 100 obtains image data from manuscript image that is to destination person who exists at a predetermined work place; generates facsimile data and sends it to a predetermined receiving destination facsimile apparatus (one of 1c~nc) via transfer/notification processing server 200. Moreover, the sending source facsimile apparatus 100 can make the facsimile data include the card ID of the destination person as destination information that specifies the destination person.

After received the facsimile data from the sending source facsimile apparatus 100 via the public line 150, the transfer/notification processing server 200 temporarily stores it into a predetermined storing section. After that, the transfer/notification processing server 200 specifies the destination person by the destination information that is set in the facsimile data, identifies a whereabouts place of the destination person, and transfers the received facsimile data to the receiving destination facsimile apparatus (one of 1c~nc) which is furnished at the work place where the destination person exists. Further, the transfer/notification processing server 200 is a calculation processing apparatus formed from PC (personal computer) or the like. The following is to explain it in detail.

Figure 2:
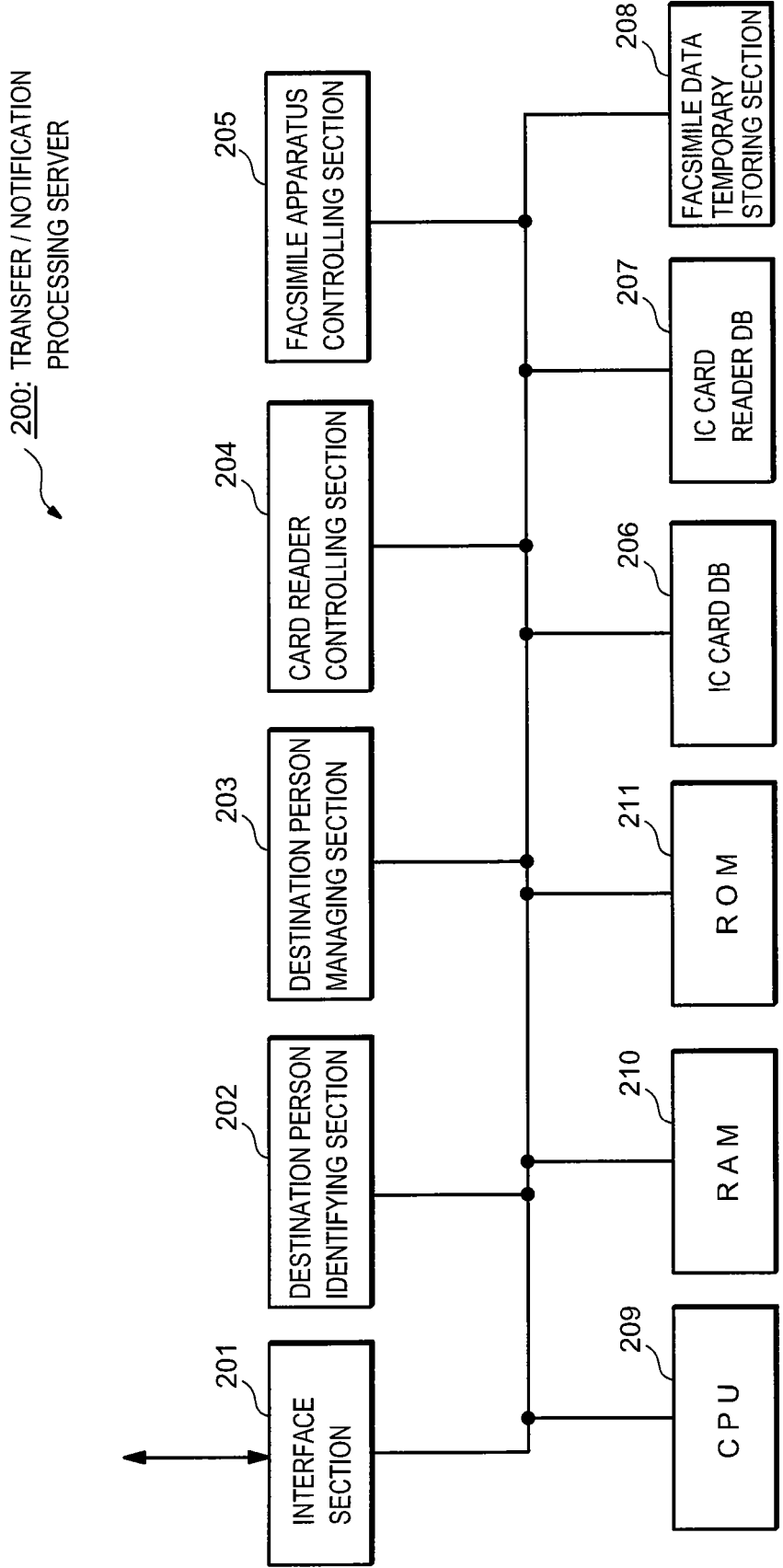
FIG. 2 is a function block diagram of a transfer/notification processing server in embodiment 1.

FIG. 2 is a function block diagram of a transfer/notification processing server in embodiment 1.

As shown by FIG. 2, the transfer/notification processing server 200 has an interface section 201, a destination person identifying section 202, a destination person managing section 203, a card reader controlling section 204, a facsimile apparatus controlling section 205, an IC card DB 206, an IC card reader DB 207, a facsimile data temporary storing section 208, a CPU 209, a RAM 210 and a ROM 211.

The interface section 201 is an interface circuit that communicatively connected the transfer/notification processing server 200 with the internal line 170. Further, the interface section 201 is a part that temporarily stores the received facsimile data into the facsimile data temporary storing section 208.

The destination person identifying section 202 is a part that obtains the destination information from the facsimile data; and identifies a destination person of the facsimile data as a card ID. Moreover, in the case that the facsimile data does not include the destination information, the destination person identifying section 202 identifies as "no designation for destination person".

The destination person managing section 203 is a part that accepts an entering-room notification of destination person from the entering-room IC card reader (1a~na) (FIG. 1) and accepts a leaving-room notification of destination person from the leaving-room IC card reader (1b~nb) (FIG. 1) respectively; records them into the IC card DB 206 and manages a whereabouts of the destination person. Regarding the management method, it will be explained in detail in an explanation of the IC card DB 206.

The card reader controlling section 204 is a part that performs a sending/receiving of a predetermined notification between the entering-room IC card reader (1a~na) and the leaving-room IC card reader (1b~nb); displays a comment on display panels of the entering-room IC card reader (1a~na) and the leaving-room IC card reader (1b~nb) in order to warn the destination person. Regarding the comment, it will be individually explained in operation explanation.

The facsimile apparatus controlling section 205 is a part that, according to an instruction of the destination person managing section 203, sends the facsimile data stored in the facsimile data temporary storing section 208 to the receiving destination facsimile apparatus (one of 1c~nc) which is furnished at the work place (one of 1~n) where the destination person exists at the present time and outputs it to print. Moreover, the facsimile apparatus controlling section 205 is also a part that transfers facsimile data that is identified as "no designation for destination person" by the destination person identifying section 202 to the predetermined receiving destination facsimile apparatus (one of 1c~nc).

The IC card DB 206 is a memory that accepts the entering-room notification of destination person from the entering-room IC card reader (1a~na) (FIG. 1) and accepts the leaving-room notification of destination person from the leaving-room IC card reader (1b~nb) (FIG. 1) respectively via the card reader controlling section 204 and records them. Generally, it is allotted a certain region of hard disk of the transfer/notification processing server 200. Here, regarding a data storing form of the IC card DB 206, it will be explained through using drawings. Further, regarding a management method, it will be explained, that the destination person managing section 203 accepts an entering-room notification of destination person from the entering-room IC card reader (1a~na) (FIG. 1) and accepts a leaving-room notification of destination person from the leaving-room IC card reader (1b~nb) (FIG. 1) respectively; records them into the IC card DB 206 and manages a whereabouts of the destination person.

Figure 3:
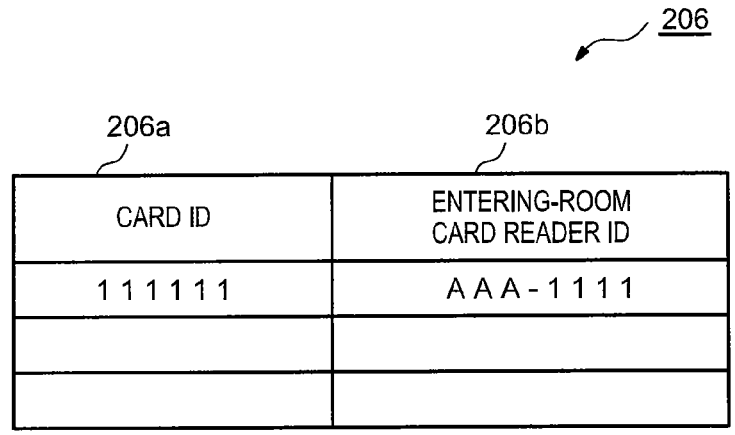
FIG. 3 is an explanatory diagram of an IC card DB in embodiment 1.

FIG. 3 is an explanatory diagram of an IC card DB in embodiment 1.

As shown by FIG. 3, the IC card DB 206 correspondingly stores a card ID of the destination person, which is obtained from destination information (sending guide card) of facsimile data that is received from the sending source facsimile apparatus 100 (FIG. 1) to the entering-room IC card reader (one of 1a~na) of the work place where the destination person exists at the present time.

As an example, as shown by FIG. 3, the card ID of the destination person, which is obtained from destination information (sending guide card) of facsimile data that is received from the sending source facsimile apparatus 100 (FIG. 1), is "111111" and it means that the destination person enters a work place corresponding to an entering-room card reader ID of "AAA-1111" (for example, the work place 1). Further, after that, when the destination person leaves "AAA-1111" (for example, the work place 1), the column becomes blank. Furthermore, after that, when the destination person enters the work place 2 (for example, the entering-room card reader ID is "BBB-2222", "BBB-2222" is stored into the column.

Here, the case that facsimile data stored in the facsimile data temporary storing section 208 is only one, is explained, however, in the case that plural facsimile data are stored, card IDs of plural destination persons are stored into a card ID column and entering-room/leaving-room is managed.

Returning to FIG. 2, the IC card reader DB 207 is a memory that stores a relation between an entering-room card reader, a leaving-room card reader and a transfer destination in advance. Generally, it is allotted a certain region of hard disk of the transfer/notification processing server 200. Here, regarding a data storing form of the IC card reader DB 207, it will be explained through using drawings.

Figure 4:
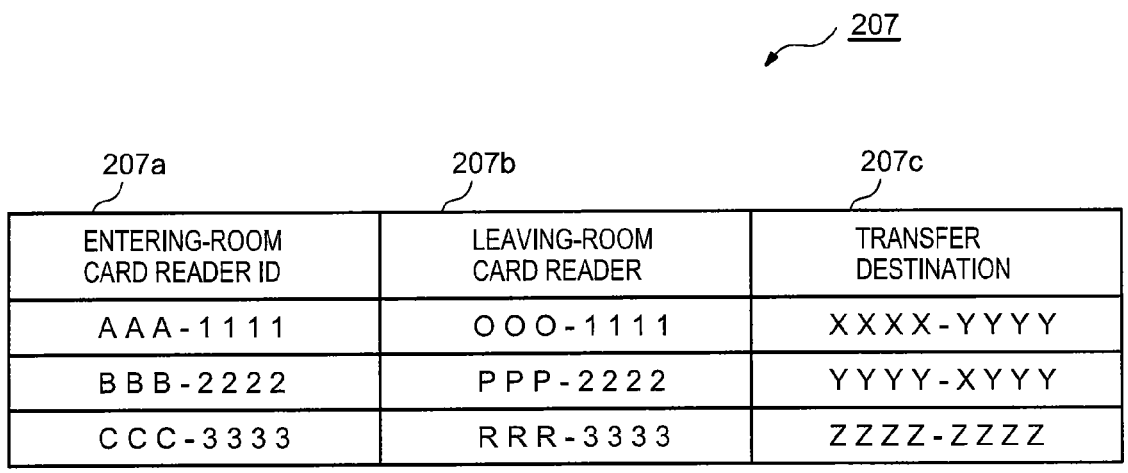
FIG. 4 is an explanatory diagram of an IC card reader DB in embodiment 1.

FIG. 4 is an explanatory diagram of an IC card reader DB in embodiment 1.

As shown by FIG. 4, in the case that the entering-room card reader ID is "AAA-1111" (for example, the entering-room IC card reader 1a of the work place 1), a corresponding leaving-room card reader ID is "OOO-1111" (for example, the leaving-room IC card reader 1b of the work place 1) and a corresponding receiving destination facsimile apparatus (transfer destination) is "XXXX-YYYY". That is, the entering-room card reader ID, the leaving-room card reader ID and the receiving destination facsimile apparatus that are in the same work place, are correspondingly stored.

Returning to FIG. 2, the facsimile data temporary storing section 208 is a memory that temporarily stores facsimile data received from the sending source facsimile apparatus 100 via the public line 150. Generally, it is allotted a certain region of hard disk of the transfer/notification processing server 200. Moreover, plural facsimile data may be temporarily stored.

The CPU 209 is a central calculation processing apparatus which controls the whole apparatus through executing a predetermined control program that is previously stored in the ROM 211. Further, the CPU 209 is a central calculation processing apparatus which starts to generate the destination person managing section 203, the card reader controlling section 204 and the facsimile apparatus controlling section 205 in order to control the whole system through executing a predetermined control program that is previously stored in the ROM 211

The RAM 210 is a random access memory that provides a calculation region to be needed when the CPU 209 executes a predetermined control program.

The ROM 211 is a read on memory that previously stores a predetermined control program and control data that control the whole apparatus through executing the CPU 209. Further, the ROM 211 is a read on memory that previously stores a control program that starts to generate the destination person managing section 203, the card reader controlling section 204 and the facsimile apparatus controlling section 205 in order to control the whole system through executing the CPU 209.

The facsimile transferring system in embodiment 1 explained above, operates as follows.

The important operations of the facsimile transferring system in embodiment 1 are a destination person whereabouts management operation and an operation of facsimile data transferring process. The following are to explain the two operations respectively.

Figure 5:
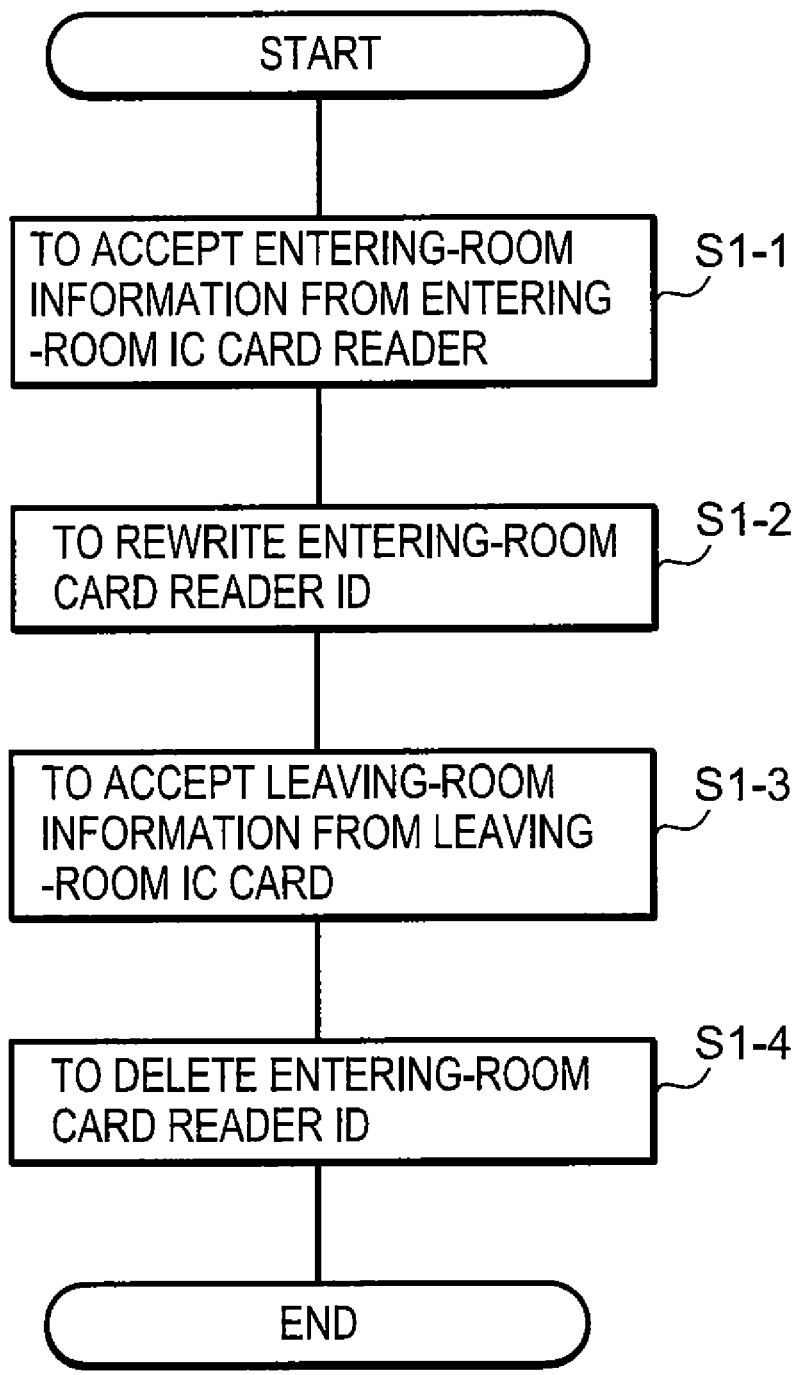
FIG. 5 is a flowchart for explaining destination person whereabouts management in embodiment 1.

FIG. 5 is a flowchart for explaining destination person whereabouts management in embodiment 1.

The flowchart represents an operation that the destination person managing section 203 pursues after a whereabouts of a destination person. It will be explained from step S1-1 to step S1-4 together with FIG. 1 and FIG. 2 according to a step order. As a precondition, the transfer/notification processing server 200 (the destination person identifying section 202) identifies a card ID of a destination person by destination information of facsimile data received from the sending source facsimile apparatus 100.

Step S1-1

When a destination person makes the entering-room IC card reader (one of 1a~na) read an IC card and enters room, a corresponding entering-room IC card reader sends a card ID extracted from the IC card, information that the destination person entered the room, and its own entering-room card reader ID to the transfer/notification processing server 200.

Step S1-2

The transfer/notification processing server 200 (the card reader controlling section 204) write the received entering-room card reader ID with respect to an entering-room card reader ID column (FIG. 3) of the IC card reader DB 207 corresponding to the received card ID.

Step S1-3

When the destination person makes the leaving-room IC card reader (one of 1b~nb) read the IC card and leaves the room, a corresponding leaving-room IC card reader sends a card ID extracted from the IC card and information that the destination person left the room to the transfer/notification processing server 200.

Step S1-4

The transfer/notification processing server 200 (the card reader controlling section 204) sets an entering-room card reader ID column corresponding to the received card ID in the IC card DB (FIG. 3) into blank.

As mentioned above, the whereabouts of a destination person is managed.

Figure 6:
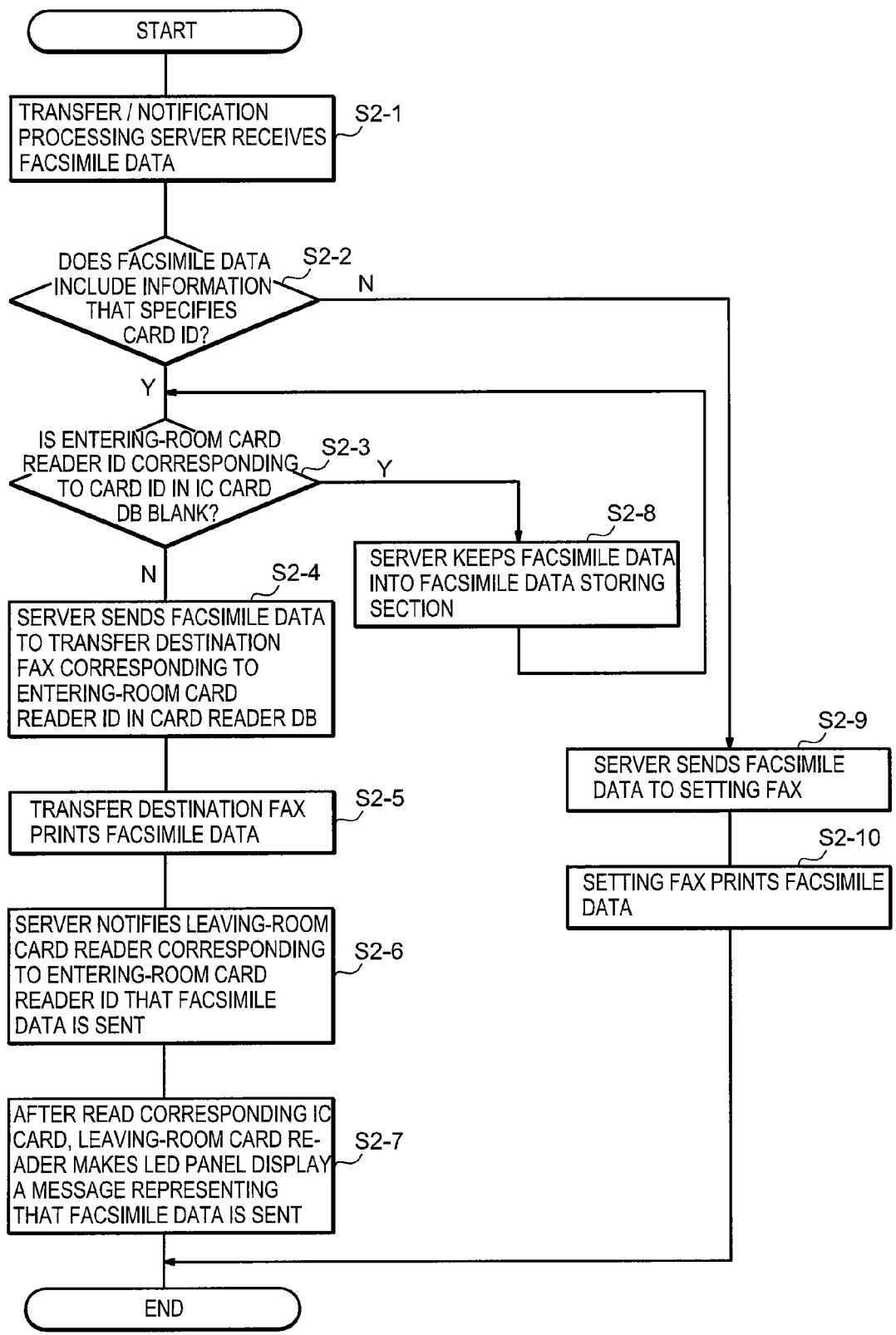
FIG. 6 is a flowchart for explaining transferring process of facsimile data in embodiment 1.

FIG. 6 is a flowchart for explaining transferring process of facsimile data in embodiment 1.

The flowchart represents an operation that the transfer/notification processing server 200 transfers facsimile data that is received from the sending source facsimile apparatus 100 to a destination person obtained from destination information. It will be explained from step S2-1 to step S2-10 together with FIG. 1~FIG. 4 according to a step order.

Step S2-1

The transfer/notification processing server 200 (the interface section 201) receives facsimile data from the sending source facsimile apparatus 100 via the public line 150 and stores it into the facsimile data temporary storing section 208.

Step S2-2

The transfer/notification processing server 200 (the destination person identifying section 202) confirms whether or not information that can specify a card ID, that is, destination person information exists in a first page of the received facsimile data. For example, image matching, reading of two-dimensional bar code or the like are performed to confirm it. In the case that specific information is included, step S2-3 is started; in the case that specific information is not included, step S2-9 is started.

Step S2-3

The transfer/notification processing server 200 (the destination person managing section 203) confirms whether or not entering-room card reader ID corresponding to the identified card ID in the IC card DB (FIG. 3), is blank. In the case that it is not blank, step S2-4 is started; in the case that it is blank, step S2-8 is started. For example, in FIG. 3, "AAA-1111" is stored in it, therefore, it is not blank.

Step S2-4

The transfer/notification processing server 200 (the facsimile apparatus controlling section 205) extracts transfer destination corresponding to the entering-room card reader ID (for example, in FIG. 3, "AAA-1111") corresponding to the identified card ID in the IC card DB (FIG. 3), from the IC card reader DB (FIG. 4), and sends facsimile data to the transfer destination (in FIG. 4, "XXXX-YYYY").

Step S2-5

The receiving destination facsimile apparatus (one of 1c~nc) at transfer destination (FIG. 1) prints and outputs the received facsimile data.

Step S2-6

The transfer/notification processing server 200 (the card reader controlling section 204), after sent the facsimile data to the transfer destination, notifies the leaving-room IC card reader (one of 1b~nb) (FIG. 1) furnished at the transfer destination that the facsimile data is sent together with a card ID of the facsimile data destination person.

Step S2-7

If an IC card which is read when the user left a room is the IC card which has the notified card ID, through the leaving-room IC card reader which is received the notice, a warning is displayed on the display panel (not shown) to represent that: because the facsimile data has been sent to the receiving destination facsimile apparatus of the work place, please do not forget to take the printed matter.

Step S2-8

The transfer/notification processing server 200 (the interface section 201), in the case that the entering-room card reader ID in the IC card DB (FIG. 3) is blank, keeps the facsimile data in the facsimile data temporary storing section 208. As soon as the entering-room card reader ID does not become a blank, the step S2-3 and the step S2-4 are started.

Step S2-9

The transfer/notification processing server 200 (the destination person identifying section 202), in the case to confirm that the facsimile data does not include information that can specify a card ID, that is, in the case to identify as "no designation for destination person", transfers the facsimile data to the receiving destination facsimile apparatus (one of 1c~nc) previously set as a facsimile apparatus to be transferred facsimile data in such case.

Step S2-10

The receiving destination facsimile apparatus (one of 1c~nc) previously set as a facsimile apparatus to be transferred facsimile data in the case that the facsimile data does not include information that can specify, after received the facsimile data from the transfer/notification processing server 200, prints and outputs the facsimile data, and then, the flow is finished.

As explained above, according to embodiment 1, it is possible to transfer facsimile data without requesting special operation for transfer with respect to user, by controlling a transfer of facsimile data through proper operation of using IC card reader when entering/leaving a room. Further, when a destination person leaves the work place, the leaving-room IC card reader notifies the destination person of being transferred facsimile data, therefore, the possibility becomes small, that paper on which the transferred facsimile data is printed is left at a place where the destination person does not exist.

Moreover, in the above explanation, it is explained that the sending source facsimile apparatus 100 makes facsimile data contains the card ID of destination person so as to regard the card ID as information to specify destination person, however, the present invention is not limited by such case. That is, it can adopt to include a telephone number of the destination person as destination information. But, in such case, the transfer/notification processing server needs to have a telephone number•card ID•DB. In the telephone number-card ID•DB, a card ID corresponding to a telephone number of the destination person is stored. Accordingly, the destination person identifying section obtains the telephone number of the destination person from the destination information, and obtains a corresponding card ID from the telephone number•card ID•DB on the basis of the telephone number.

Embodiment 2

In the above embodiment 1, if the leaving-room IC card reader detects a destination person, only displays a warning representing to prevent a printed matter from leaving as it is, however, in embodiment 2, because the leaving-room IC card reader confirms whether or not a printed matter is received by the destination person; and continues to warn till it is confirmed, it is possible to reduce a possibility that a paper on which facsimile data is printed is left at a place where the destination person does not exist.

Figure 7:
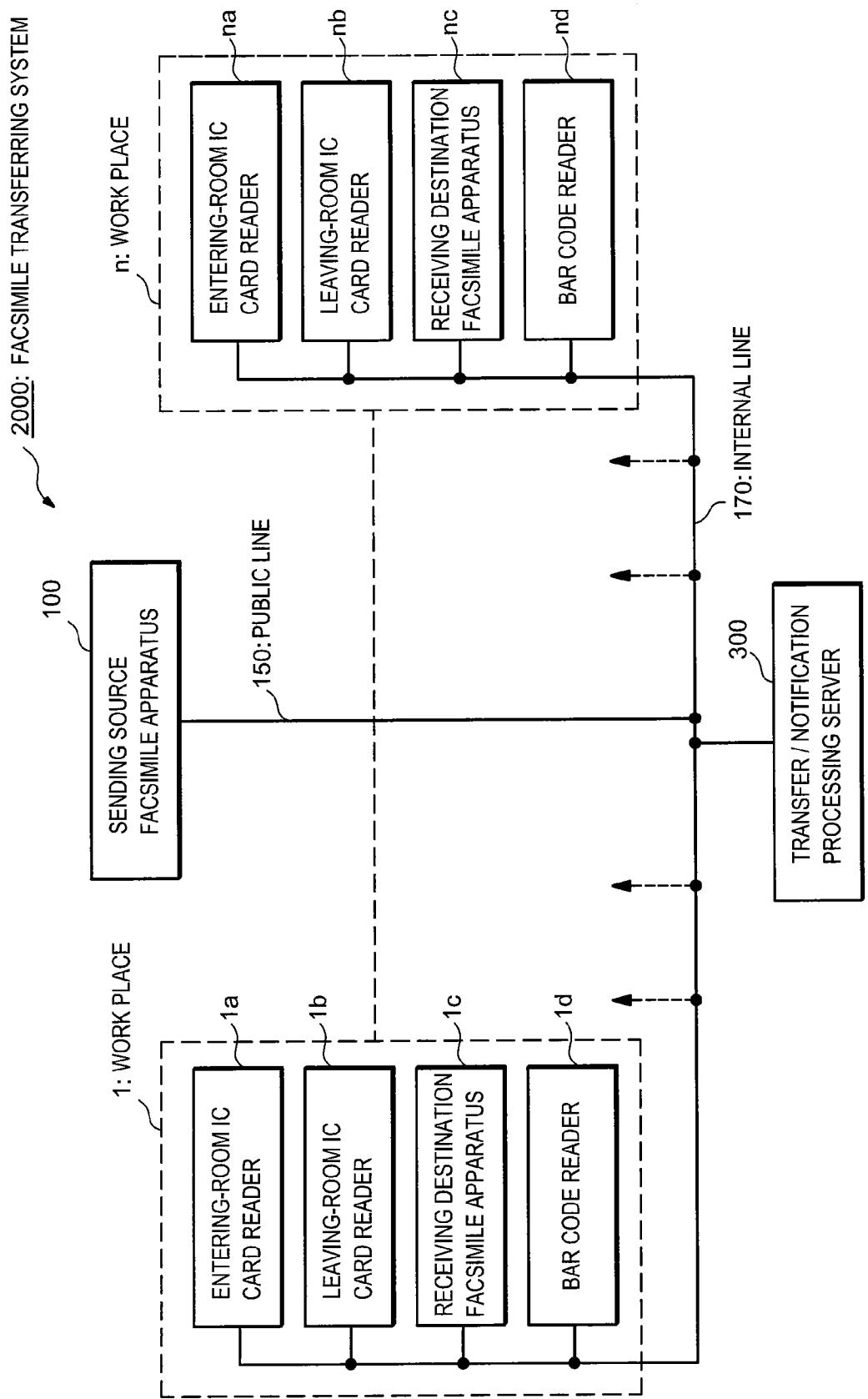
FIG. 7 is a system structure diagram of embodiment 2.

FIG. 7 is a system structure diagram of embodiment 2.

As shown by FIG. 7, for example, a facsimile transferring system 2000 in embodiment 2 is furnished at a business office having plural work places 1~n. As shown by FIG. 7, an internal line 170 formed from LAN or the like, is furnished at the business office having plural work places 1~n, and entering-room IC card readers (1a~na), leaving-room IC card readers (1b~nb), receiving destination facsimile apparatuses (1c~nc), bar code readers (1d~nd) and a transfer/notification processing server 300 are respectively connected with the internal line 170. Further, the sending source facsimile apparatus 100 is connected with the internal line 170 via the public line 150 formed from a telephone line or the like. Generally, the internal line 170 is connected with the public line 150 via internal exchanging apparatus or the like, however, in the explanation of the present invention, the explanation about the internal exchanging apparatus is not directly needed, therefore, it is omitted. The following is only to explain the part different from the embodiment 1, the same symbols are assigned and their explanations are omitted.

The bar code readers (1d~nd) are apparatuses that read a receiving confirmation use bar code from a paper on which the transferred facsimile data is printed. The receiving confirmation use bar code is appended when the facsimile data is transferred with respect to the receiving destination facsimile apparatuses (1d~nd) from the transfer/notification processing server 300.

After received the facsimile data from the sending source facsimile apparatus 100 via the public line 150, the transfer/notification processing server 300 temporarily stores it into a predetermined storing section. After that, the transfer/notification processing server 300 specifies the destination person by the destination information that is set in the facsimile data, identifies a whereabouts place of the destination person, and transfers the received facsimile data. Further, the transfer/notification processing server 300 is a calculation processing apparatus formed from PC (personal computer) or the like. Furthermore, in embodiment 2, the transfer/notification processing server 300 is a part that appends a bar code to a receiving confirmation use print data to manage non-receiving of facsimile output when transferring the facsimile data.

The following is to explain it in detail.

Figure 8:
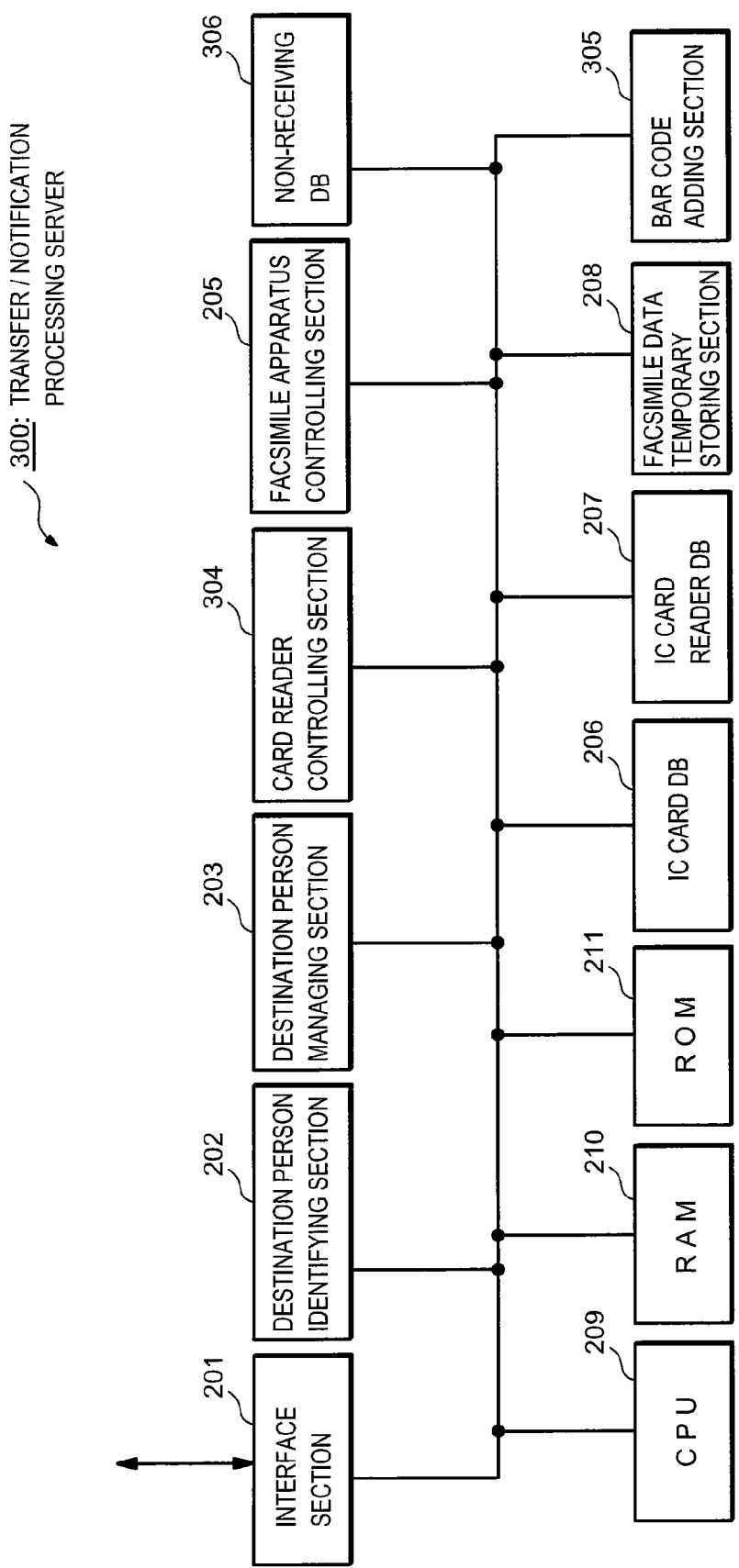
FIG. 8 is a function block diagram of a transfer/notification processing server in embodiment 2.

FIG. 8 is a function block diagram of a transfer/notification processing server in embodiment 2.

As shown by FIG. 8, the transfer/notification processing server 300 has an interface section 201, a destination person identifying section 202, a destination person managing section 203, a card reader controlling section 304, a facsimile apparatus controlling section 205, an IC card DB 206, an IC card reader DB 207, a facsimile data temporary storing section 208, a bar code adding section 305, a non-receiving DB 306, a CPU 209, a RAM 210 and a ROM 211.

The card reader controlling section 304 is a part that performs a sending/receiving of a predetermined notification between the entering-room IC card reader (1a~na) and the leaving-room IC card reader (1b~nb); displays a comment on display panels of the entering-room IC card reader 1a and the leaving-room IC card reader in order to warn the destination person. Further, the card reader controlling section 304 is also a part that manages non-receiving of facsimile output and warns the destination person.

The bar code adding section 305 is a part that generates a facsimile data ID for specifying a facsimile data when transferring a facsimile data to the receiving destination facsimile apparatuses (1d~nd); further, appends a bar code as a receiving confirmation use information of facsimile output by the destination person. The bar code includes the facsimile data ID.

The non-receiving DB 306 is a memory that registers a card ID which is mentioned in the destination person information of the facsimile data and the facsimile data ID which is inherent in one facsimile data as non-receiving information when transferring the facsimile data to the receiving destination facsimile apparatuses (1c~nc) from the transfer/notification processing server 300.

FIG. 9 is an explanatory diagram of a non-receive DB.

As shown by FIG. 9, a card ID 1001 of the destination person of the facsimile data is registered; and a facsimile data ID 1002 which corresponds to the card ID 1001 and is inherent in the facsimile data, is registered.

The above-explained facsimile transferring system in embodiment 2 operates as follows.

The important operations of the facsimile transferring system in embodiment 2 are a destination person whereabouts management operation, an operation of transferring process of facsimile data and an operation of a receiving confirmation process. However, the destination person whereabouts management operation is the same as that in embodiment 1 (FIG. 5), accordingly, its explanation is omitted; and regarding the operation of transferring process of facsimile data and the operation of a receiving confirmation process, they will explain respectively.

Figure 10:
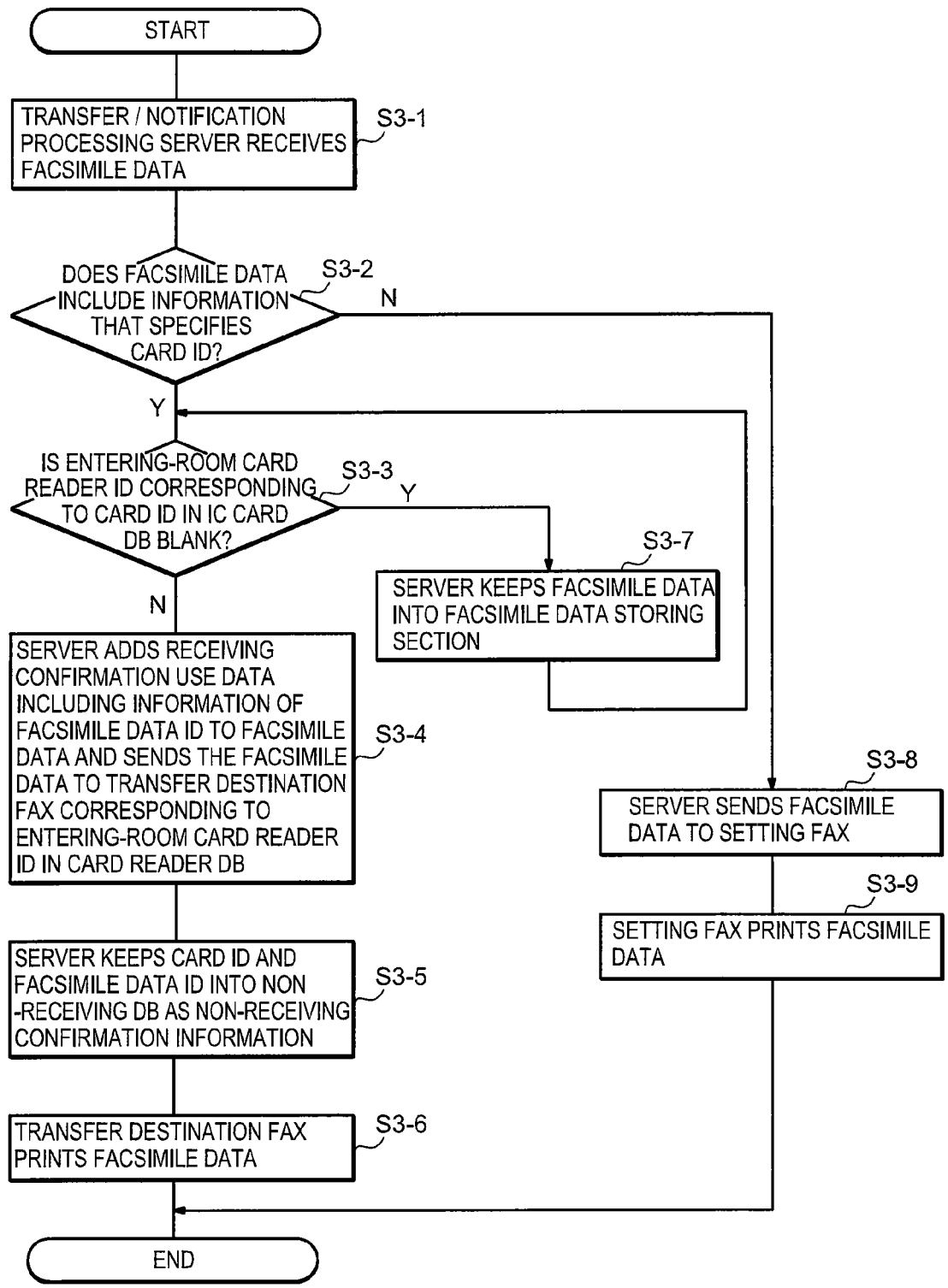
FIG. 10 is a flowchart for explaining transferring process of facsimile data in embodiment 2.

FIG. 10 is a flowchart for explaining transferring process of facsimile data in embodiment 2.

The flowchart represents an operation that the transfer/notification processing server 300 transfers facsimile data that is received from the sending source facsimile apparatus 100 to a destination person obtained from destination information. It will be explained from step S3-1 to step S3-9 together with FIG. 7~FIG. 9 according to a step order.

Step S3-1

The transfer/notification processing server 300 (the interface section 301) receives facsimile data from the sending source facsimile apparatus 100 via the public line 150; appends a facsimile data ID; and stores it into the facsimile data temporary storing section 208.

Step S3-2

The transfer/notification processing server 300 (the destination person identifying section 202) confirms whether or not information that can specify a card ID, that is, destination person information exists in a first page of the received facsimile data. For example, image matching, reading of two-dimensional bar code or the like are performed to confirm it. In the case that specific information is included, step S3-3 is started; in the case that specific information is not included, step S3-8 is started.

Step S3-3

The transfer/notification processing server 300 (the destination person managing section 203) confirms whether or not entering-room card reader ID corresponding to the identified card ID in the IC card DB (FIG. 3), is blank. In the case that it is not blank, step S3-4 is started; in the case that it is blank, step S3-7 is started.

Step S3-4

The transfer/notification processing server 300 (the bar code adding section 305) generates a facsimile data ID which is inherent in the facsimile data to be transferred and generates a bar code which includes the facsimile data ID as information. A receiving confirmation use data including the bar code, is appended to the facsimile data to be transferred, and the facsimile data becomes final transfer facsimile data. Then, a transfer destination (FIG. 4) corresponding to the entering-room card reader ID (FIG. 3) in the IC card reader DB 207 is extracted, and the final transfer facsimile data is sent to the transfer destination.

Step S3-5

The transfer/notification processing server 300 registers the specified card ID and the facsimile data ID at the non-receiving DB 306 as non-receiving information (FIG. 9).

Step S3-6

The receiving destination facsimile apparatus (one of 1c~nc) prints the received facsimile data, and then, the flow is finished.

Step S3-7

The transfer/notification processing server 300 (the interface section 201), in the case that the entering-room card reader ID in the IC card DB (FIG. 3) is blank, keeps the facsimile data in the facsimile data temporary storing section 208. As soon as the entering-room card reader ID does not become a blank, the step S3-3 and the step S3-4 are started.

Step S3-8

The transfer/notification processing server 300, in the case to confirm that the facsimile data does not include information that can specify a card ID, that is, in the case to identify as "no designation for destination person", transfers the facsimile data to the receiving destination facsimile apparatus (one of 1c~nc) previously set as a facsimile apparatus to be transferred facsimile data in such case.

Step S3-9

The receiving destination facsimile apparatus (one of 1c~nc) previously set as a facsimile apparatus to be transferred facsimile data in the case that the facsimile data does not include information that can specify a card ID, prints and outputs the facsimile data, and then, the flow is finished.

Figure 11:
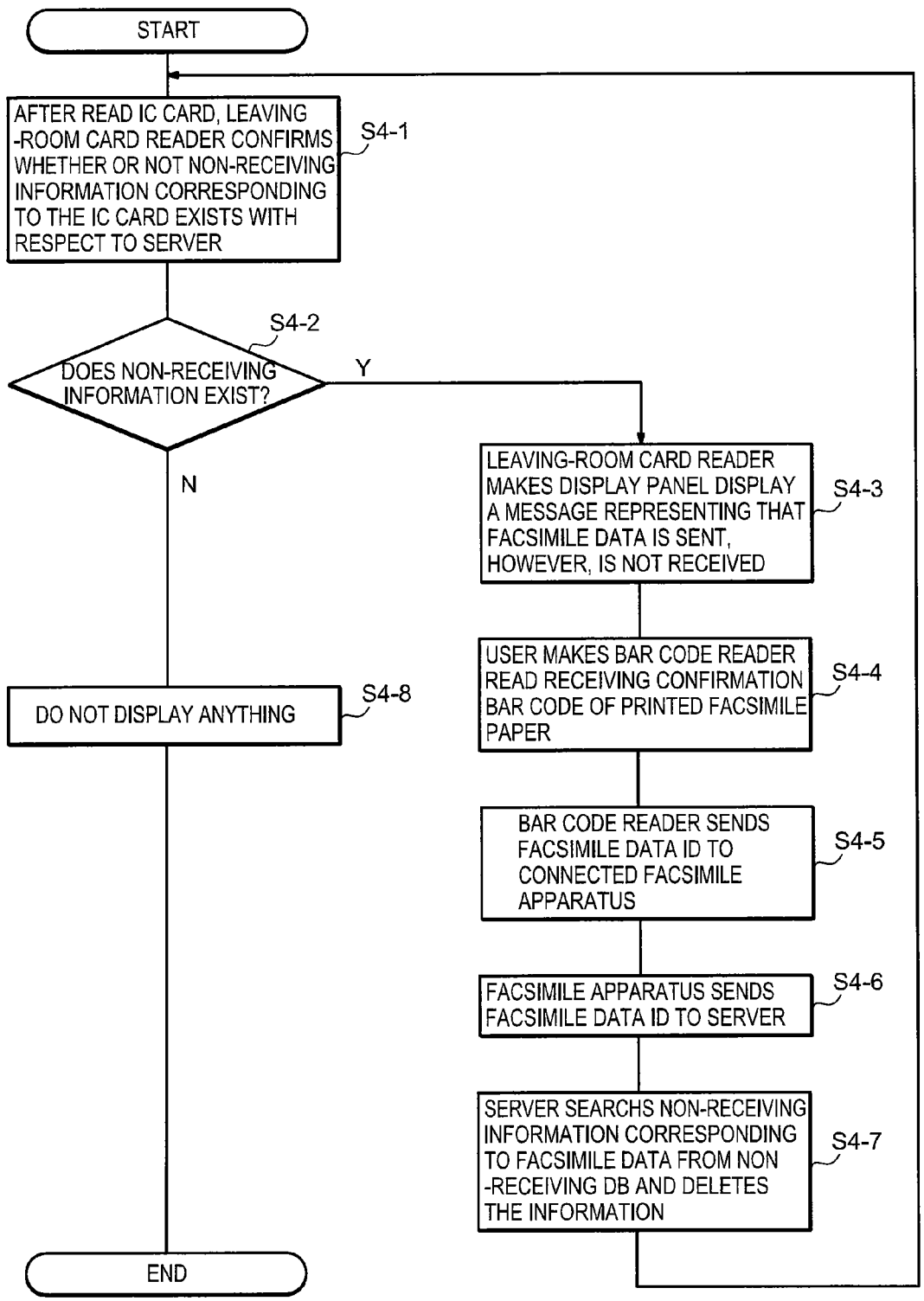
FIG. 11 is a flowchart for explaining receiving confirming process in embodiment 2.

FIG. 11 is a flowchart for explaining receiving confirming process in embodiment 2.

The flowchart represents an operation to confirm that the destination person receives a facsimile printed matter of the facsimile data that the transfer/notification processing server 300 received from the sending source facsimile apparatus 100. It will be explained from step S4-1 to step S4-9 together with FIG. 7~FIG. 9 according to a step order.

Step S4-1

When the destination person leaves the work place (one of 1~n), the destination person makes the leaving-room IC card reader (one of 1b~nb) furnished at the work place read the IC card. The leaving-room IC card reader (one of 1b~nb), after read the IC card, sends a card ID of the read IC card and a non-receiving confirmation request to the transfer/notification processing server 300 via internal line 170 and confirms whether or not a non-receiving information corresponding to the card ID exists.

Step S4-2

The transfer/notification processing server 300, after received the received card ID and the non-receiving confirmation request from the leaving-room IC card reader (one of 1b~nb), searches a non-receiving information that is registered at the non-receiving DB 306 and confirms whether or not the card ID is registered at the non-receiving DB 306. In the case that the card ID is registered, step S4-3 is started; in the case that the card ID is not registered, step S4-8 is started.

Step S4-3

The transfer/notification processing server 300 sends a notification of non-receiving with respect to the leaving-room IC card reader (one of 1b~nb) via internal line 170. The leaving-room IC card reader (one of 1b~nb) that receives the notification makes a display panel (not shown) display a warning representing that a facsimile printed matter is not received.

Step S4-4

The destination person receives the facsimile printed matter and makes the bar code reader (one of 1d~nd) read receiving confirmation use print paper which is printed a bar code of the facsimile printed matter.

Step S4-5

The bar code reader (one of 1d~nd) which reads the bar code, sends a facsimile data ID to the receiving destination facsimile apparatus (one of 1c~nc).

Step S4-6

The receiving destination facsimile apparatus (one of 1c~nc), after received the facsimile data ID, sends the facsimile data ID to the transfer/notification processing server 300.

Step S4-7

The transfer/notification processing server 300 (the card reader controlling section 304) deletes the non-receiving information corresponding to the received facsimile data ID from the non-receiving DB 306.

Step S4-8

The transfer/notification processing server 300 sends information that the received card ID is not registered at the non-receiving DB 306 to the leaving-room IC card reader (one of 1b~nb). The leaving-room IC card reader (one of 1b~nb) which received the information that the received card ID is not registered, finished the flow without displaying anything.

As explained above, according to the present invention, it is possible to transfer facsimile data without requesting special operation for transfer with respect to user through performing a transfer of facsimile data by proper operation of using IC card reader when entering/leaving a room. Further, it is possible to confirm whether or not a facsimile printed matter is received by destination person through appending a bar code to facsimile data and managing the bar code, therefore, it is possible to more effectively prevent the facsimile printed matter from leaving as it is.

Moreover, according to the present invention, entering-room/leaving-room reader may be furnished to physically approaching to facsimile apparatus; further, it may be furnished together with the facsimile apparatus.

Furthermore, in the step 306 of FIG. 10 in the embodiment 2, when transfer destination FAX prints facsimile data, it is possible to inform user of a message representing "Please use barcode reader to read barcode on the received facsimila paper" via voice, scene or paper. Then, in the case that user does not see the message, it is possible to inform again user of the message according to the flow of FIG. 11.

The utilization possibility in industry:

In the above embodiments, only such case is explained that the present invention is applied to a facsimile apparatus, however, it is not limited by this. That is, the present invention also can be applied to a MFP (Multiplex Function Peripheral) which has a facsimile function and the like.

The present invention is not limited to the foregoing embodiments but many modifications and variations are possible within the spirit and scope of the appended claims of the invention.

What is claimed is:

1. A facsimile transferring system, comprising:
   a plurality of facsimile apparatuses, each of which is furnished at one of a plurality of places;
   a transfer/notification processing server; and
   a mobile terminal,
   wherein the transfer/notification processing server comprises:
      a receiving section that receives and stores in a predetermined storing section facsimile data which includes destination information, the destination information being information for identifying the mobile terminal;
      a mobile terminal whereabouts managing section that stores and manages transfer destination decision information that indicates which of the plurality of facsimile apparatuses is located near the mobile terminal, the transfer destination decision information being information for deciding a transfer destination of the received facsimile data;
      a deciding section that decides a facsimile apparatus located near the mobile terminal as a transfer destination of the received facsimile data on the basis of the destination information and the transfer destination decision information;
      a transferring section that transfers the facsimile data from the predetermined storing section to the decided facsimile apparatus; and
      an obtaining section that obtains information that indicates detection of the mobile terminal from an externally located detecting section, and
   each of the plurality of facsimile apparatuses comprises:
      an output section that outputs the transferred facsimile data; and
   wherein the mobile terminal whereabouts managing section updates the transfer destination decision information on the basis of the information obtained by the obtaining section, and
   the deciding section decides the transfer destination of the facsimile data on the basis of the updated transfer destination decision information.

2. The facsimile transferring system according to claim 1, further comprising:
   a plurality of entering/leaving room managing equipments, each of which is furnished at one of the plurality of places,
   wherein,
   the transfer destination decision information is outputted by one of the entering/leaving room managing equipments to the transfer/notification processing server, and is stored in the mobile terminal whereabouts managing section.

3. The facsimile transferring system according to claim 2, wherein the transfer/notification processing server further includes an entering/leaving room managing equipment controlling section that sends a facsimile data transfer notification to the entering/leaving room managing equipment furnished at the same place as that of the facsimile apparatus decided as the transfer destination when a facsimile apparatus controlling section transfers the facsimile data to the decided facsimile apparatus.

4. The facsimile transferring system according to claim 3, wherein the entering/leaving room managing equipment displays a warning representing to prevent a printed matter from being forgotten after accepted the facsimile data transfer notification.

5. The facsimile transferring system according to claim 4, wherein the transfer/notification processing server further includes a facsimile data inherent information appending section that appends a inherent information specifying the facsimile data to the facsimile data,
  an inherent information identifying section that identifies printed matter printed the inherent information is further furnished at the plural places respectively,
  the entering/leaving room managing equipment stops displaying a warning representing to prevent the printed matter from being forgotten when the inherent information identifying section identifies the printed matter printed the inherent information.

6. The facsimile transferring system according to claim 1, wherein when the destination information is not included in the received facsimile data, the transfer/notification processing server transfers the facsimile data to a predetermined facsimile apparatus previously set as a facsimile apparatus to be transferred facsimile data when the destination information is not included in the received facsimile data.

7. The facsimile transferring system according to claim 1, wherein the transfer/notification processing server further comprises a storing section, and when the transfer destination decision information corresponding to the mobile terminal identified by the destination information which is included in the received facsimile data is not stored in the mobile terminal whereabouts managing section, the received facsimile data is stored in the storing section.

8. The facsimile transferring system according to claim 7, wherein when the transfer destination decision information corresponding to the facsimile data previously stored in the storing section is subsequently stored in the mobile terminal whereabouts managing section, the deciding section decides a facsimile apparatus as the transfer destination on the basis of the transfer destination decision information, and the transferring section transfers the previously stored facsimile data to the decided facsimile apparatus.

9. The facsimile transferring system according to claim 2, wherein the plurality of facsimile apparatuses and the plurality of entering/leaving room managing equipments are furnished at a plurality of rooms respectively,
  each of the entering/leaving room managing equipments has an entering-room mobile terminal reader, and
  when the entering-room mobile terminal reader reads mobile terminal identification information from the mobile terminal, the entering-room mobile terminal reader outputs the mobile terminal identification information along with identification information of the entering-room mobile terminal reader to the transfer/notification processing server, and the mobile terminal whereabouts managing section stores the identification information of the entering-room mobile terminal reader in correspondence with the mobile terminal identification information as the transfer destination decision information.

10. The facsimile transferring system according to claim 9, wherein when a leaving-room mobile terminal reader reads the mobile terminal identification information from the mobile terminal, the leaving-room mobile terminal reader outputs the mobile terminal identification information, and the mobile terminal whereabouts managing section deletes the identification information of the entering-room mobile terminal reader stored in correspondence with the mobile terminal identification information.

11. The facsimile transferring system according to claim 9, wherein the transfer/notification processing server further includes an entering/leaving room managing equipment controlling section that sends a facsimile data transfer notification to a leaving-room mobile terminal reader furnished at the same place as that of the facsimile apparatus decided as the transfer destination when a facsimile apparatus controlling section transfers the facsimile data to the decided facsimile apparatus, and the leaving-room mobile terminal reader notifies of being transferred the facsimile data when the leaving-room mobile terminal reader reads the mobile terminal identification information of the mobile terminal corresponding to the transferred facsimile data.

12. A data transferring system, comprising:
  a plurality of information processing apparatuses, each of which is furnished at one of a plurality of places;
  a transfer/notification processing server; and
  a mobile terminal,
  wherein the transfer/notification processing server comprises:
    a receiving section that receives and stores in a predetermined storing section information processing data which includes destination information, the destination information being information for identifying the mobile terminal;
    a mobile terminal whereabouts managing section that stores and manages transfer destination decision information that indicates which of the plurality of information processing apparatuses is located near the mobile terminal, the transfer destination decision information being information for deciding a transfer destination of the received information processing data;
    a deciding section that decides an information processing apparatus located near the mobile terminal as a transfer destination of the received information processing data on the basis of the destination information and the transfer destination decision information;
    a transferring section that transfers the information processing data from the predetermined storing section to the decided information processing apparatus; and
    an obtaining section that obtains information that indicates detection of the mobile terminal from an externally located detecting section, and
  each of the plurality of information processing apparatuses comprises:
    an output section that outputs the transferred information processing data; and
  wherein the mobile terminal whereabouts managing section updates the transfer destination decision information on the basis of the information obtained by the obtaining section, and the deciding section decides the transfer destination of the information processing data on the basis of the updated transfer destination decision information.

13. A facsimile transferring system, comprising:
a plurality of facsimile apparatuses, each of which is furnished at one of a plurality of places respectively;
a transfer/notification processing server, wherein the transfer/notification processing server comprises:
   a receiving section that receives and stores in a predetermined storing section facsimile data which includes destination information, the destination information being information for identifying a destination person;
   a destination person whereabouts managing section that stores and manages transfer destination decision information which indicates which of the plurality of facsimile apparatuses is located near a user corresponding to the destination person, the transfer destination decision information being information for deciding a transfer destination of the received facsimile data;
   a deciding section that decides a facsimile apparatus located near the user corresponding to the destination person as a transfer destination of the received facsimile data on the basis of the destination information and the transfer destination decision information;
   a transferring section that transfers the facsimile data from the predetermined storing section to the decided facsimile apparatus; and
   an obtaining section that obtains information that indicates detection of the destination person from an externally located detecting section, and each of the plurality of facsimile apparatuses comprises:
   an output section that outputs the transferred facsimile data; and
wherein the destination person whereabouts managing section updates the transfer destination decision information on the basis of the information obtained by the obtaining section, and
the deciding section decides the transfer destination of the facsimile data on the basis of the updated transfer destination decision information.

* * * * *